(12) United States Patent
Naidu et al.

(10) Patent No.: US 11,615,001 B2
(45) Date of Patent: Mar. 28, 2023

(54) INCREMENTAL RESTORE OF A VIRTUAL MACHINE

(71) Applicant: NetApp Inc., Sunnyvale, CA (US)

(72) Inventors: Abhishek Naidu, San Jose, CA (US); Jose Mathew, Santa Clara, CA (US); Ling Zheng, Saratoga, CA (US); Ravindra Kuramkote, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 405 days.

(21) Appl. No.: 16/856,322

(22) Filed: Apr. 23, 2020

(65) Prior Publication Data

US 2020/0409803 A1 Dec. 31, 2020

Related U.S. Application Data

(60) Provisional application No. 62/867,504, filed on Jun. 27, 2019.

(51) Int. Cl.
*G06F 11/14* (2006.01)
*G06F 9/455* (2018.01)
*G06F 3/06* (2006.01)

(52) U.S. Cl.
CPC .......... *G06F 11/1469* (2013.01); *G06F 3/065* (2013.01); *G06F 3/0619* (2013.01);
(Continued)

(58) Field of Classification Search
CPC .. G06F 11/14; G06F 11/1469; G06F 11/1451; G06F 11/1458; G06F 11/1464; G06F 11/1484
See application file for complete search history.

(56) References Cited

U.S. PATENT DOCUMENTS

| | | | | |
|---|---|---|---|---|
| 5,515,499 A | * | 5/1996 | Allen | G06F 11/1658 |
| | | | | 714/E11.133 |
| 8,060,474 B2 | * | 11/2011 | Beatty | G06F 11/1469 |
| | | | | 707/821 |

(Continued)

FOREIGN PATENT DOCUMENTS

CN 105094948 A 11/2015

OTHER PUBLICATIONS

International Search Report and Written Opinion for Application No. PCT/US2020/039038, dated Sep. 25, 2020, 10 pages.

*Primary Examiner* — Kamini B Patel
(74) *Attorney, Agent, or Firm* — Cooper Legal Group, LLC

(57) ABSTRACT

Techniques are provided for incrementally restoring a virtual machine hosted by a computing environment. In response to receiving an indication that the virtual machine is to be incrementally restored, a snapshot of the virtual machine may be created while the virtual machine is shut down into an off state. The snapshot is transmitted to a storage environment as a common snapshot. The snapshot and the common snapshot are common snapshots comprising a same representation of the virtual machine. The common snapshot and a prior snapshot of the virtual machine are evaluated to identify a data difference of the virtual machine between the common snapshot and the prior snapshot. An incremental restore is performed of the virtual machine by transmitting the data difference from the storage environment to the computing environment to restore the virtual machine to a state represented by the prior snapshot.

23 Claims, 7 Drawing Sheets

(52) U.S. Cl.
CPC .......... *G06F 3/0664* (2013.01); *G06F 3/0673* (2013.01); *G06F 9/45558* (2013.01); *G06F 11/1451* (2013.01); *G06F 11/1458* (2013.01); *G06F 11/1464* (2013.01); *G06F 2009/45562* (2013.01); *G06F 2009/45575* (2013.01); *G06F 2201/80* (2013.01); *G06F 2201/815* (2013.01); *G06F 2201/84* (2013.01)

(56) References Cited

U.S. PATENT DOCUMENTS

| | | | |
|---|---|---|---|
| 8,255,650 B1 * | 8/2012 | Gruttadauria | G06F 9/45558 711/170 |
| 8,566,542 B1 | 10/2013 | Wang et al. | |
| 8,983,961 B2 * | 3/2015 | Chan | G06F 16/128 714/48 |
| 9,292,327 B1 * | 3/2016 | von Thenen | G06F 9/45558 |
| 9,665,437 B2 * | 5/2017 | Bhargava | G06F 11/1446 |
| 9,740,520 B1 | 8/2017 | Sarda et al. | |
| 9,898,371 B2 | 2/2018 | Kumarasamy et al. | |
| 10,146,634 B1 * | 12/2018 | Bishop | G06F 11/1484 |
| 10,152,387 B1 * | 12/2018 | Chakraborty | G06F 11/1469 |
| 10,169,067 B2 | 1/2019 | Dornemann | |
| 10,210,048 B2 | 2/2019 | Sancheti | |
| 10,754,741 B1 | 8/2020 | Sethuramalingam et al. | |
| 10,824,455 B2 * | 11/2020 | Arikatla | G06F 9/45558 |
| 11,023,329 B1 * | 6/2021 | Per | G06F 11/1469 |
| 11,025,717 B2 * | 6/2021 | Liu | G06F 3/065 |
| 11,099,956 B1 * | 8/2021 | Polimera | G06F 11/2048 |
| 11,188,422 B2 * | 11/2021 | Cisler | G06F 16/11 |
| 11,323,259 B2 * | 5/2022 | Maximov | H04L 9/0861 |
| 2012/0117311 A1 | 5/2012 | Hong | |
| 2013/0061293 A1 | 3/2013 | Mao | |
| 2013/0238562 A1 | 9/2013 | Kumarasamy et al. | |
| 2014/0032838 A1 | 1/2014 | Takeuchi et al. | |
| 2014/0074790 A1 | 3/2014 | Berman et al. | |
| 2014/0195503 A1 | 7/2014 | Kao et al. | |
| 2014/0196056 A1 | 7/2014 | Kottomtharayil et al. | |
| 2014/0244818 A1 | 8/2014 | Taine et al. | |
| 2017/0116219 A1 | 4/2017 | Shetty | |
| 2017/0171311 A1 | 6/2017 | Tennie et al. | |
| 2017/0171340 A1 | 6/2017 | Kurita | |
| 2018/0157538 A1 | 6/2018 | Raikov et al. | |
| 2019/0104196 A1 | 4/2019 | Li et al. | |
| 2019/0235971 A1 | 8/2019 | Botelho et al. | |
| 2020/0042344 A1 | 2/2020 | Ao et al. | |
| 2020/0133502 A1 | 4/2020 | Yang et al. | |
| 2020/0183731 A1 | 6/2020 | Dornemann | |
| 2020/0409738 A1 | 12/2020 | Naidu et al. | |

* cited by examiner

INCREMENTAL RESTORE OF A VIRTUAL MACHINE

RELATED APPLICATION

This application claims priority to and benefit of U.S. Provisional Application No. 62/867,504, titled "BACKUP AND RESTORE BETWEEN A COMPUTING ENVIRONMENT AND A STORAGE ENVIRONMENT" and filed on Jun. 27, 2019, which is incorporated herein by reference.

BACKGROUND

A computing environment may be configured to host virtual machines that are made accessible to client devices. The computing environment may comprise a virtual machine management platform, a hypervisor (e.g., an Elastic Sky X (ESX) server), and/or other hardware and software used to host and manage the virtual machines. The hypervisor utilizes software to abstract processor, memory, storage, and networking resources for use by one or more virtual machines. Each virtual machine runs its own operating system (a guest operating system) and applications. The hypervisor creates logical pools of system resources from the same physical resources. The logical pools of system resources are each assigned to individual virtual machines to enable multiple virtual machines to separately share the same physical resources. A virtual machine may execute a guest operating system that stores user data, application data, and operating system data within virtual machine disks.

The computing environment, such as the virtual machine management platform, may not provide adequate data protection and storage functionality required by clients. In an example, the computing environment may not provide adequate levels of deduplication, compression, encryption, backup and restore functionality, incremental backup and restore functionality, and/or other levels of storage functionality required by the clients. For example, the virtual machine management platform may be capable of generating a snapshot of a virtual machine. However, such snapshots are not backed up and retained by the computing environment due to the cost and performance overhead of maintaining snapshots within the computing environment. Thus, the virtual machine host platform does not provide adequate data protection and storage efficiency for backing up and restoring data of the virtual machines, such as incrementally restoring the virtual machines, in a scalable manner.

DETAILED DESCRIPTION

Figure 1:
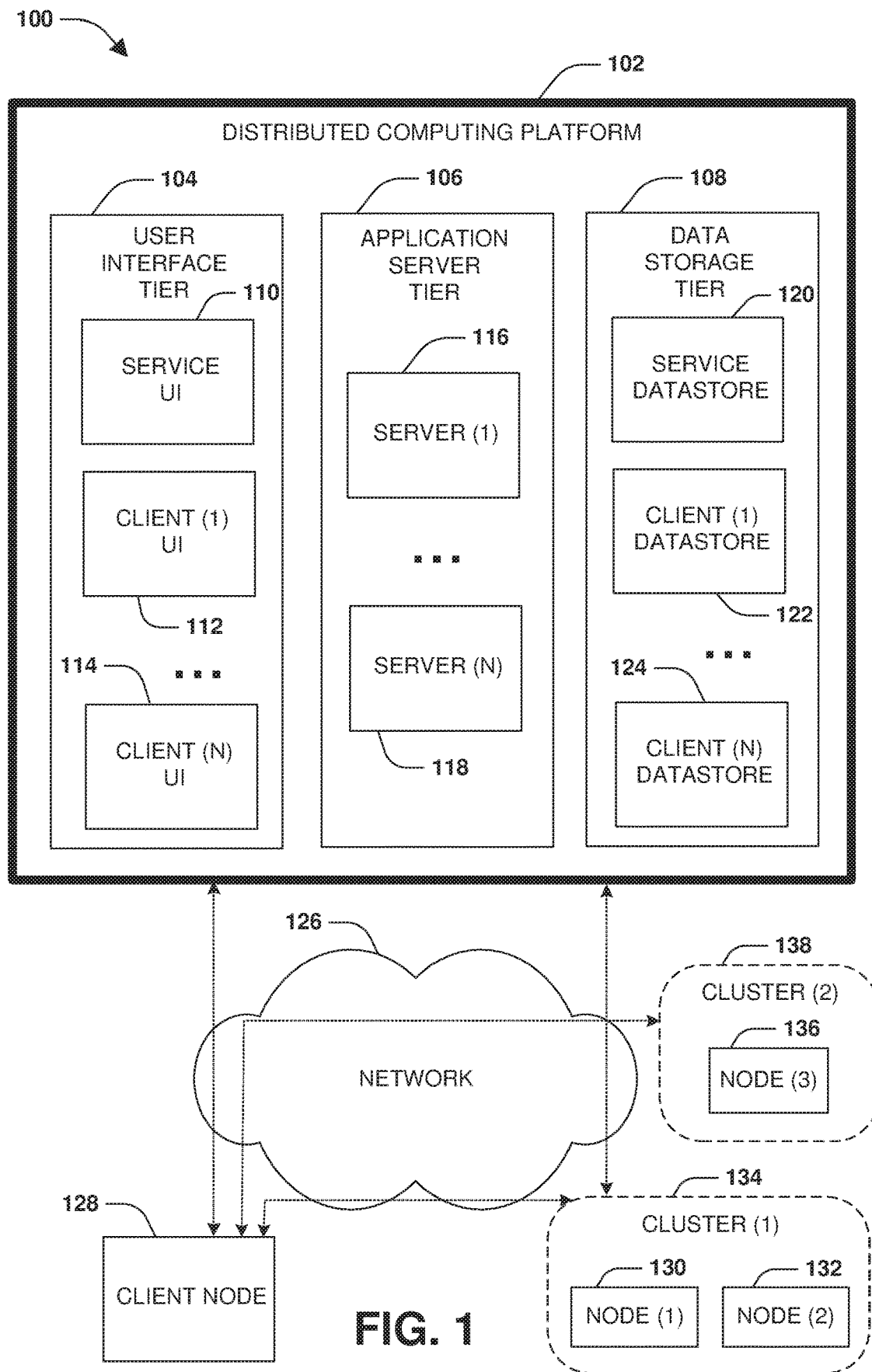
FIG. 1 is a block diagram illustrating an example computing environment in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A computing environment provides virtualization layer services and virtual machine hosting functionality to host virtual machines that can be accessed by client devices for storing data, executing applications, hosting services, etc. For example, the computing environment may comprise a hypervisor, such as an Elastic Sky X (ESX) server, configured to host virtual machines. The computing environment may comprise a virtual machine management platform that provides a variety of services for managing virtual machines, such as the creation of snapshots of virtual machines.

A virtual machine may execute a guest operating system that can be accessed by a client device. The client device can use the guest operating system to execute applications, create and store data within virtual machine disks used by the virtual machine to store data, etc. The computing environment may provide basic storage and management functionality for the virtual machines, such as by maintaining virtual machine disks within which virtual machines can store data, along with the ability to generate snapshot backups of the virtual machines by creating snapshots of the virtual machine disks. However, the computing environment such as the virtual machine management platform may lack adequate data protection and storage functionality for providing a level of data protection and storage efficiency required by clients for backing up and restoring data of the virtual machines in a scalable manner. For example, snapshots generated by the virtual machine management platform are not backed up and retained by the computing environment due to cost and performance overhead from maintaining snapshots within the computing environment.

Because the virtual machine management platform does not retain snapshots of a virtual machine, the virtual machine management platform cannot incrementally restore the virtual machine to a prior state of the virtual machine. This is because the incremental restore uses two snapshots in order to incrementally restore a data difference between the two snapshots to the virtual machine. Unfortunately, the virtual machine management platform does not retain such snapshots due to cost and performance overhead. Thus, the virtual machine management platform does not provide adequate data protection and storage efficiency for backing up and incrementally restoring data of the virtual machines in a scalable manner.

In contrast, a storage environment may provide robust data protection and storage functionality, such as long term scalable storage, backup functionality, restore functionality, incremental backup and restore functionality, deduplication, encryption, compression, data migration between various types of storage such as on-premise storage and cloud storage, snapshot creation, snapshot storage, snapshot management, etc. Unfortunately, the computing environment and the storage environment are unable to natively communicate and coordinate with one another in order to perform various operations, such as backup and restore operations, incremental backup and restore operations, snapshot creation operations, etc. This is because the storage environment may implement specific application programming interfaces (APIs), communication protocols, data storage formats, commands and operations, and/or other services and functionality that are not natively compatible with specific APIs, communication protocols, data storage formats, commands and operations, and/or other services and functionality implemented by the computing environment. Thus, the robust storage functionality of the storage environment, such as the ability to perform incremental restores of virtual machines, cannot be natively leveraged to provide data protection and storage efficiency for the virtual machines hosted within the computing environment because the computing environment and the storage environment are not natively compatible with one another.

Furthermore, even if a snapshot of the virtual machine could be backed up to the storage environment, the virtual machine could not be incrementally restored at the computing environment using the snapshot. This is because an incremental restore uses not only a snapshot that captures a prior state of the virtual machine to which the virtual machine is to be restored, but also uses a common snapshot of the virtual machine that would be common to both the computing environment and the storage environment. However, the computing environment does not retain such snapshots due to the cost and performance overhead. Without the ability to perform an incremental restore, restoration is limited to merely a baseline restore where an entire snapshot's contents must be transferred from the storage environment where the snapshot is stored to the computing environment where the virtual machine is hosted. If the virtual machine has a large volume of data, then the baseline restore can take a substantial amount of time compared to an incremental restore where merely changes between the common snapshot and the snapshot being restore is transferred.

Accordingly, as provided herein, an agent component, a virtual machine agent (e.g., a virtual machine proxy), and a storage agent (e.g., a storage proxy) are implemented in order to provide the computing environment with data protection and storage functionality provided by the storage environment. In particular, the virtual machine hosted within the computing environment may be incrementally restored to a state of a prior snapshot of the virtual machine, the prior snapshot having been backed up from the computing environment to the storage environment. The incremental restore may be orchestrated by the agent component utilizing the virtual machine agent to interact with the computing environment and the storage agent to interact with the storage environment. The virtual machine agent is configured to be compatible with APIs, communication protocols, data storage formats, commands and operations, and/or other services and functionality of the computing environment.

For example, the virtual machine agent can interact with APIs of the virtual machine management platform in order to invoke the virtual machine management platform to create a snapshot of the virtual machine hosted by a hypervisor within the computing environment. The virtual machine agent can access metadata of the snapshot created within the computing environment, which may be tracked within memory of the virtual machine agent. The virtual machine agent may process the metadata to create a metafile to store within the storage environment. The metafile comprises various information about the snapshot, such as a snapshot identifier of the snapshot, virtual machine disk information of virtual machine disks captured by the snapshot, a disk layout of the virtual machine disks, disk attributes of the virtual machine disks, file information of files within the virtual machine disks, a list of inodes of the files, and/or other information.

The agent component uses the storage agent to write the metafile from the virtual machine agent into storage of the storage environment, such as within a volume of the storage environment. Also, the storage agent receives the snapshot data, destined for the storage environment, from the virtual machine management platform. Because the storage environment supports particular APIs, communication protocols, data storage formats, commands and operations, and/or other services and functionality for the storage environment that may be natively incompatible with the computing environment and the virtual machine management platform, the storage agent formats (packages) the snapshot into a protocol format supported by the storage environment, such as a format used by a snapshot management service of the storage environment. In this way, snapshot data of the snapshot is transferred to the storage environment in a format understood and interpretable by the snapshot management service and the storage of the storage environment. Once the baseline backup of the virtual machine is complete, incremental backups of the virtual machine may be performed. In this way, any number of snapshots of the virtual machine may be backed up to the storage environment.

In order to perform an incremental restore of the virtual machine hosted at the computing environment by the hypervisor, the agent component utilizes the virtual machine agent to invoke the virtual machine management platform (e.g., access APIs of the virtual machine management platform) to shut down the virtual machine into an off state. This way, no client I/O can modify data of the virtual machine until after the incremental restore is complete. To perform the incremental restore, a common snapshot between the computing environment and the storage environment is used. To do that, once the virtual machine is shut down, the agent component utilizes the virtual machine agent to invoke the virtual machine management platform (e.g., access APIs of the virtual machine management platform) to create a snapshot of the virtual machine. The agent component utilizes the virtual machine agent to perform an incremental backup of the snapshot to the storage environment.

The agent component utilizes the storage agent to format (package) the snapshot data into a format used by the snapshot management service and storage of the storage environment. Once formatted, the snapshot is stored into the storage environment by the storage agent as a common snapshot. With this incremental backup, now both the storage environment and the computing environment have common snapshots (e.g., the snapshot at the computing environment and the snapshot at the storage environment are common snapshots), and the common snapshot at the storage environment is used to perform the incremental restore of the virtual machine to a target snapshot comprising a state to which the virtual machine is to be restored.

Once the common snapshots are established between the computing environment and the storage environment, the agent component can utilize the storage agent to invoke the snapshot management service of the storage environment (e.g., access APIs of the snapshot management service) to determine a data difference between the common snapshot and a prior snapshot stored within the storage environment. The prior snapshot may represent a prior state of the virtual machine to which the virtual machine is to be restored. The agent component may utilize the storage agent and/or the virtual machine agent to transfer the data difference between the common snapshot and the prior snapshot from the storage environment to the computing environment for incrementally restoring the virtual machine. For example, the data difference may be applied to virtual machine disks of the virtual machine that are currently in a common snapshot state in order to restore the virtual machine to the state represented by the prior snapshot. Once the restore is finished, the snapshot at the computing environment (the common snapshot at the computing environment) may be deleted in order to reduce cost and performance overhead otherwise wasted in maintaining the snapshot at the computing environment.

Performing the incremental restore of the virtual machine conserves computing resources and network bandwidth by transferring data of the incremental snapshot from the computing environment to the storage environment in order to establish the common snapshots (e.g., the transferred data of the snapshot may merely comprise incremental backup data corresponding to changes to the virtual machine since a last backup) and then transferring the data difference from the storage environment to the computing environment. The amount of data being transferred is less than the amount of data that would otherwise be transferred if a single snapshot, and not the common snapshots, is available because only a full restore of all data of the virtual machine would be available.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine node executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that the file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
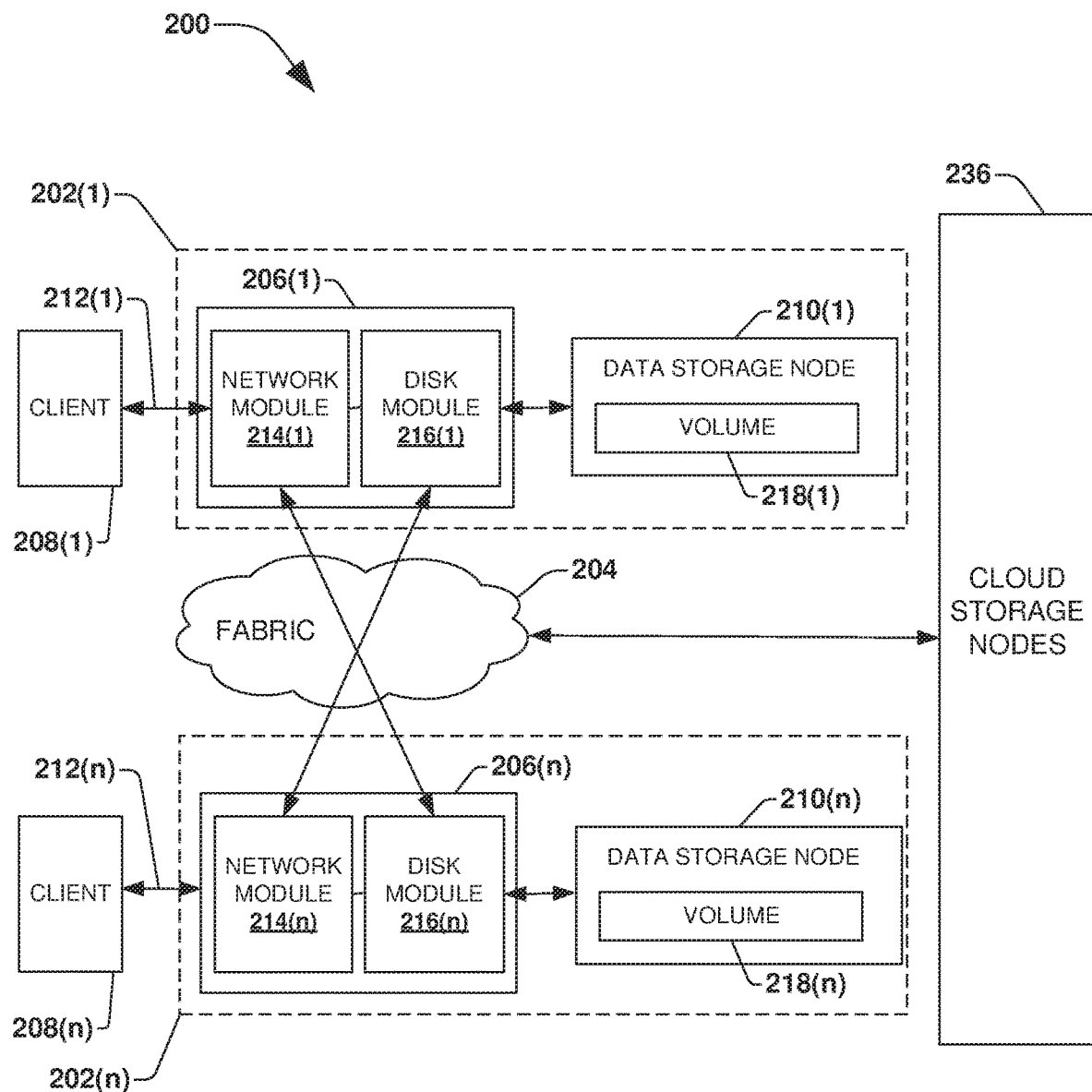
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-

212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual machine disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
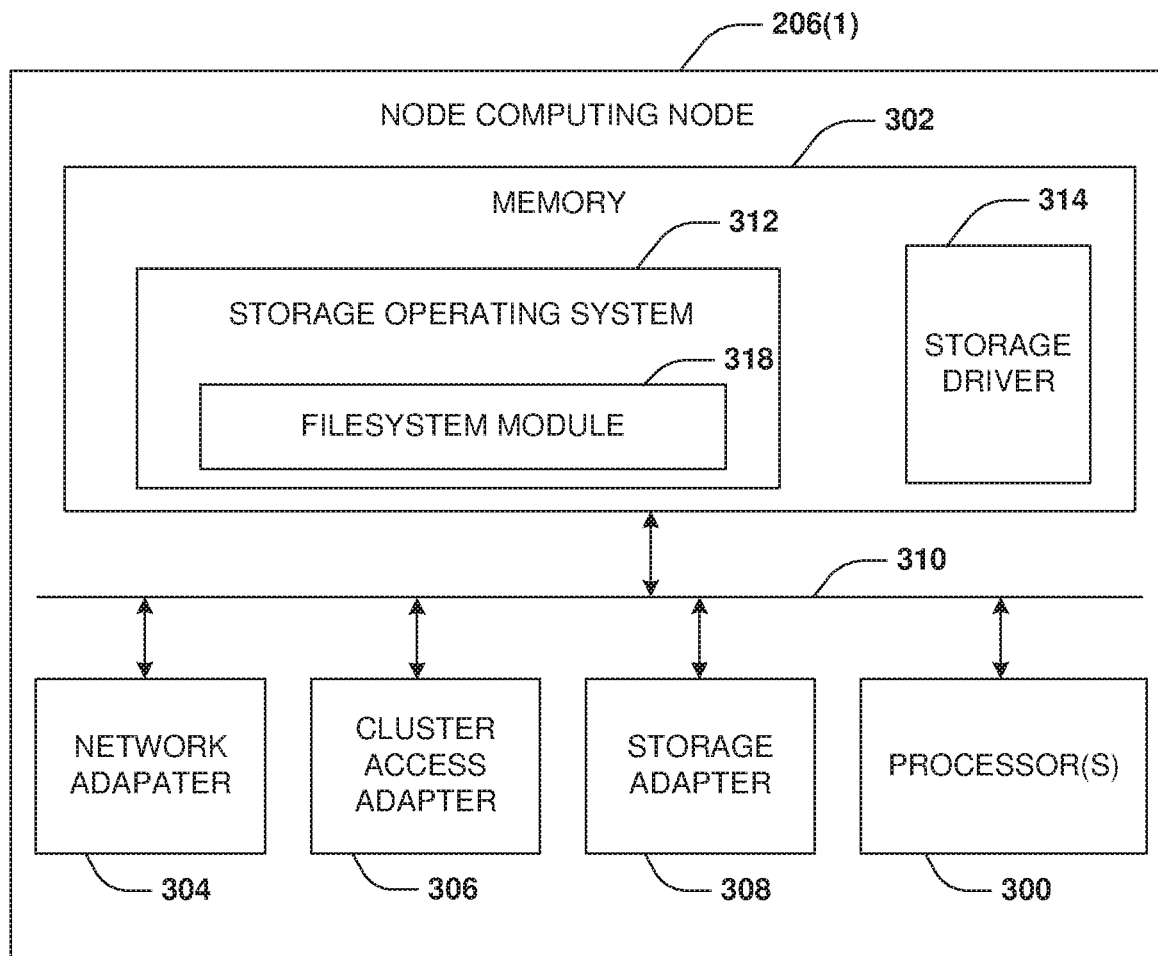
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(n) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, including for example incrementally restoring virtual machines as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
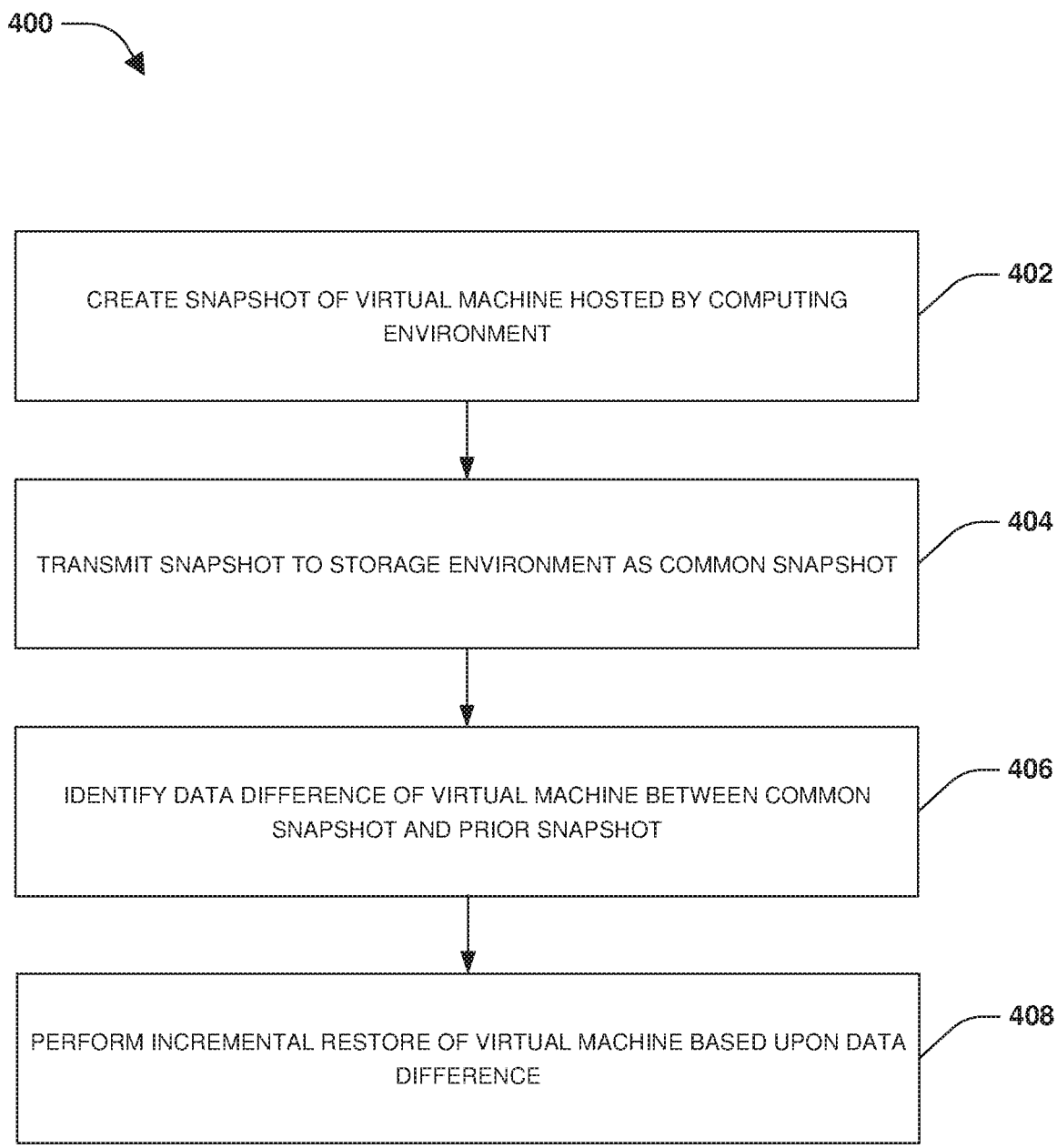
FIG. 4 is a flow chart illustrating an example method for incrementally restoring a virtual machine.
Figure 5A:
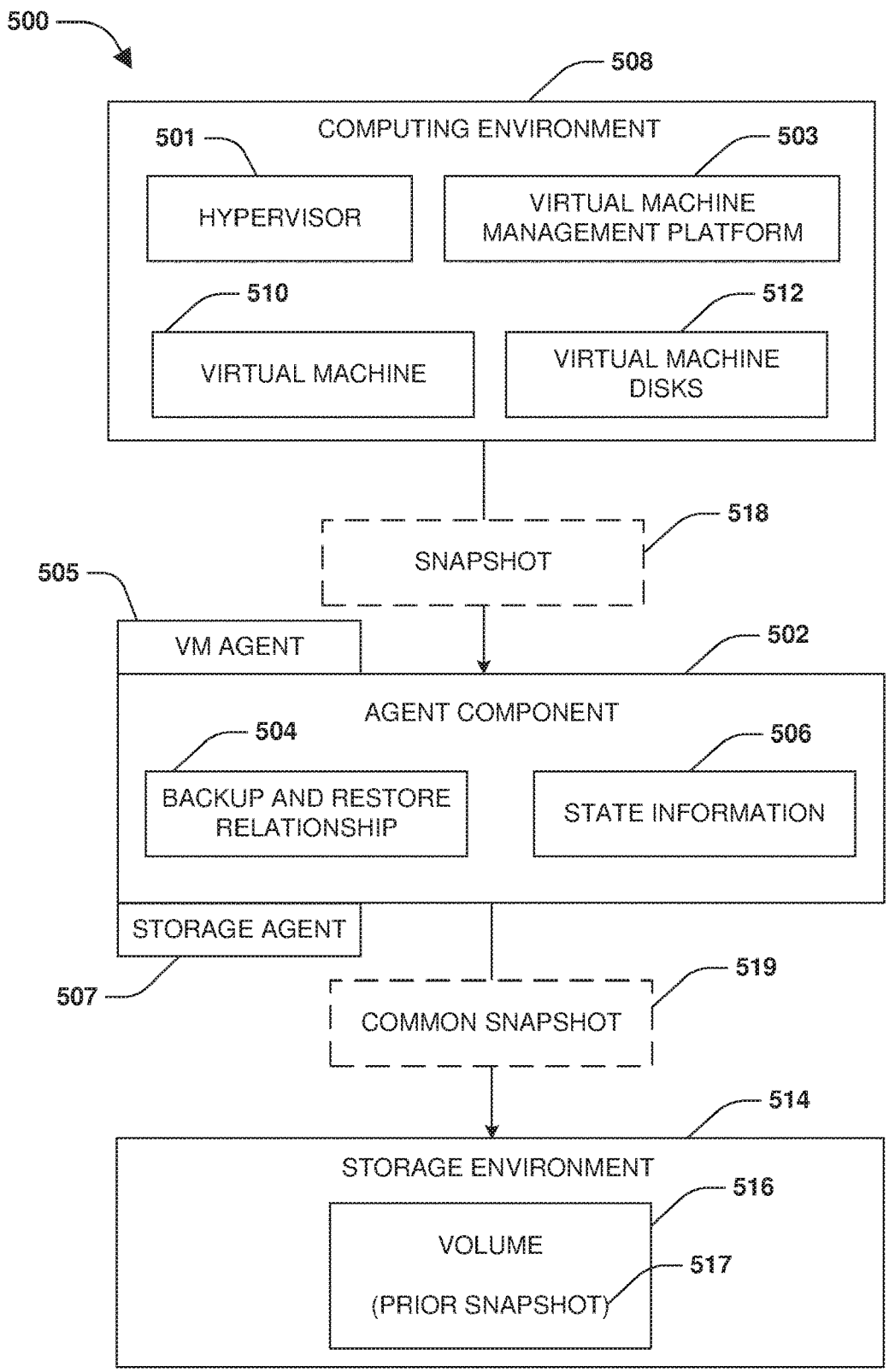
FIG. 5A is a block diagram illustrating an example system for incrementally restoring a virtual machine, where a snapshot and a common snapshot are created as common snapshots for performing an incremental restore of the virtual machine.
Figure 5B:
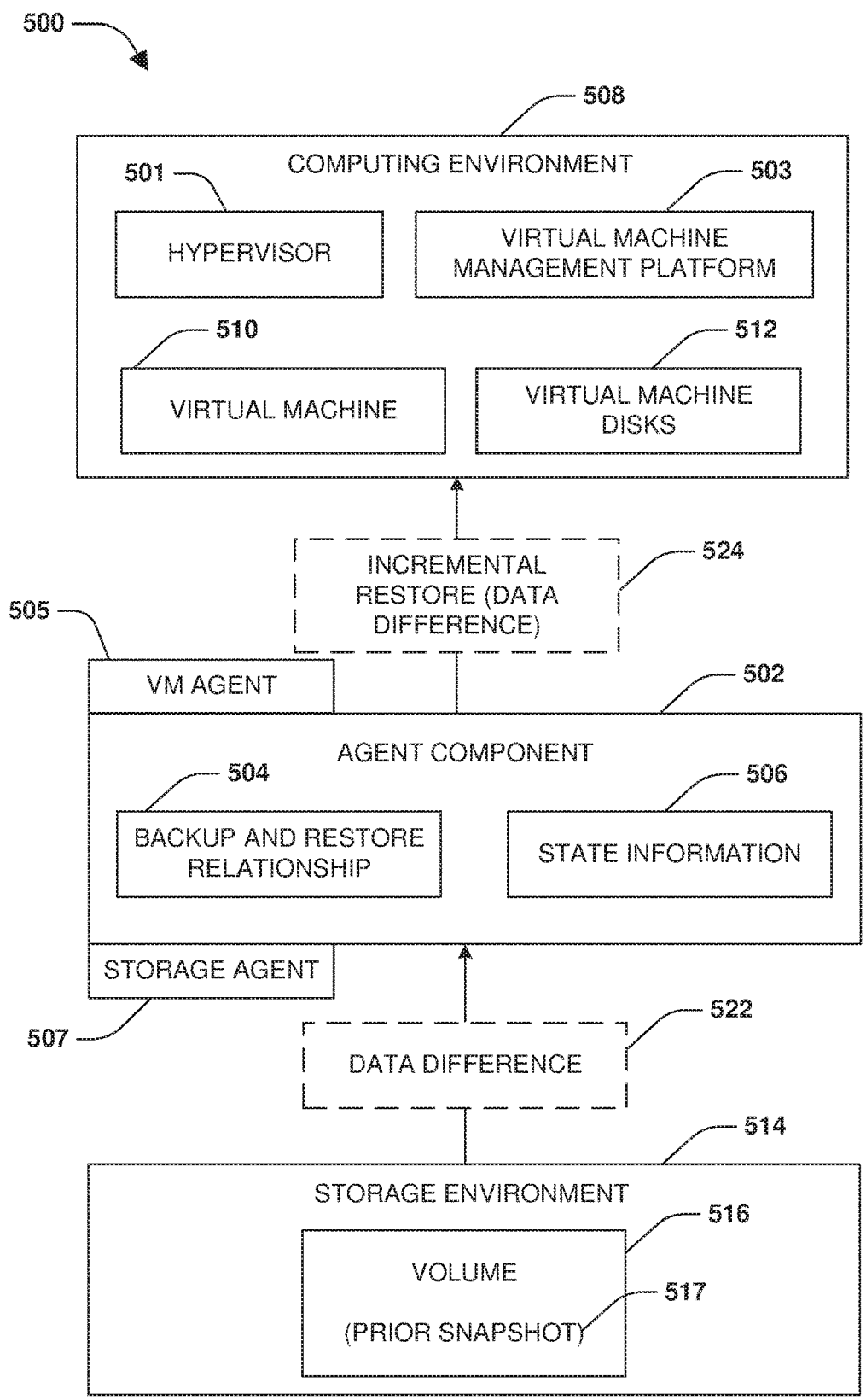
FIG. 5B is a block diagram illustrating an example system for incrementally restoring a virtual machine, where a data difference is applied to the virtual machine for incrementally restoring the virtual machine.

One embodiment of performing an incremental restore for a virtual machine 510 is illustrated by an exemplary method 400 of FIG. 4, which is further described in conjunction with system 500 of FIGS. 5A and 5B. A computing environment 508 may comprise a hypervisor 501 configured to host virtual machines that can be accessed by client devices. For example, the hypervisor 501 of the computing environment 508 may host a virtual machine 510 that stores user data, application data, and/or operating system data within one or more virtual machine disks such as virtual machine disks 512 stored within the computing environment 508. The computing environment 508 may comprise a virtual machine management platform 503 configured to provide various virtualization services and functionality, such as creating virtual machines, deleting virtual machines, allocating storage and virtual machine disks for virtual machines, creating snapshots of virtual machines, etc.

However, the computing environment 508 may not provide adequate data protection for the virtual machines. For example, the cost and performance overhead associated with storing snapshots of all of the virtual machines hosted by the computing environment 508 may be prohibitively expensive (e.g., the cost to store and long term retain multiple snapshots for thousands of virtual machines would be prohibitively expensive). Thus, the virtual machine management platform 503 may not provide the ability to incrementally restore the virtual machines hosted by the hypervisor 501 because snapshots used to perform incremental restores may be not stored within the computing environment 508 for performing the incremental restores.

In contrast, a storage environment 514 may comprise a storage operating system and/or storage functionality, such as replication functionality, data mirroring functionality, backup functionality, restore functionality, deduplication, compression, storage virtual machine hosting, a snapshot management service, a file system that stores data within volumes, LUNs, aggregates, etc. Unfortunately, the computing environment 508 and the storage environment 514 are unable to natively communicate and coordinate with one another in order to perform various operations such as to create snapshots of the virtual machines hosted within the computing environment 508, backup those snapshots to the storage environment 514, and perform incremental restores for the virtual machines using the snapshots within the storage environment 514. This is because the storage environment 514 may implement specific application programming interfaces (APIs), communication protocols, data storage formats, commands and operations, and/or other services and functionality that are not compatible with APIs, communication protocols, data storage formats, commands and operations, and/or other services and functionality implemented by the computing environment 508. Thus, the robust storage functionality of the storage environment 514 cannot be natively leveraged to provide data protection and storage efficiency for the virtual machines hosted within the computing environment 508 such as the virtual machine 510 because the computing environment 508 and the storage environment 514 are not natively compatible with one another.

Accordingly, as provided herein, an agent component 502 is configured to interact with the computing environment 508 through a virtual machine agent 505 (e.g., a virtual machine proxy) and the storage environment 514 through a storage agent 507 (e.g., a storage proxy) in order to provide the computing environment 508 with data protection and storage functionality provided by the storage environment 514. In particular, the agent component 502 utilizes the virtual machine agent 505 and the storage agent 507 to provide storage functionality of the storage environment 514 for the computing environment 508. For example, the agent component 502 facilitates the backup of virtual machines from the computing environment 508 to the storage environment 514, along with the ability to incrementally restore the virtual machines using the backups stored within the storage environment 514.

The agent component 502 interacts with the virtual machine agent 505 in order to communicate with the computing environment 508. For example, the agent component 502 uses the virtual machine agent 505 to interact with the hypervisor 501 to identify virtual machines hosted by the hypervisor 501, the virtual machine disks 512 stored within the computing environment 508, and/or other information of the computing environment 508. The agent component 502 interacts with the virtual machine management platform 503 in order to invoke various functionality provided by the virtual machine management platform 503, such as creating, deleting, or managing virtual machines, creating, deleting, or managing snapshots of the virtual machines, facilitating an incremental restore of the virtual machines, etc.

The virtual machine agent 505 may be capable of reformatting, modifying (e.g., adding, removing, and/or replacing parameters, variables, statements, text, and/or other data within commands), and/or replacing (e.g., replacing a command with another command mapped to the command and formatted to be compatible with the computing environment 508) commands and data from the agent component 502 and the storage environment 514 into commands that are compatible with the computing environment 508. For example, the virtual machine agent 505 may reformat commands from the storage environment 514 into a format expected by APIs of the virtual machine management platform 503. This is because the virtual machine agent 505 is configured to be compatible with the specific APIs, communication protocols, data storage formats, commands and operations, and/or other services and functionality implemented by the computing environment 508.

Similarly, the agent component 502 interacts with the storage agent 507 in order to communicate with the storage environment 514. The storage agent 507 may be used to access various storage services, such as a snapshot management service, configured to perform full backups of data, incremental backups of data, full restores of data, incremental restores of data, long term retention of backed up data, data migration between various storage locations and providers, snapshot management, identification of a data difference between two snapshots in order to perform an incremental restore, etc. The storage agent 507 in may be capable of reformatting, modifying (e.g., adding, removing, and/or replacing parameters, variables, statements, text, and/or other data within commands), and/or replacing (e.g., replacing a command with another command mapped to the command and formatted to be compatible with the storage environment 514) commands and data (e.g., repackaging snapshot data into a format compatible with the snapshot management service; transforming metadata into a metafile; etc.) from the agent component 502 and the computing environment 508. The commands are reformatted, modified, and/or replaced as commands that are compatible with the storage environment 514. This is because the storage agent 507 is configured to be compatible with the particular APIs, communication protocols, data storage formats, commands and operations, and/or other services and functionality implemented by the storage environment 514.

The agent component 502 may be hosted within any environment or by any component, such as within the computing environment 508, within the storage environment 514, within a separate computer, within a cloud computing environment, as a virtual machine, using hardware and/or software, or any combination thereof. Similarly, the virtual machine agent 505 may be hosted within any environment or by any component, such as within the agent component 502, separate from the agent component 502, within the computing environment 508, within the storage environment 514, within a separate computer, within a cloud computing environment, as a virtual machine, using hardware and/or software, or any combination thereof. Furthermore, the storage agent 507 may be hosted within any environment or by any component, such as within the agent component 502, separate from the agent component 502, within the computing environment 508, within the storage environment 514, within a separate computer, within a cloud computing environment, as a virtual machine, using hardware and/or software, or any combination thereof.

The agent component 502 may determine that a backup is to be performed for the virtual machine 510 to the storage environment 514 (e.g., the agent component 502 may receive an indication from the storage environment 514 that the backup is to be performed). The backup may be triggered based upon a threshold amount of time occurring since a prior backup of the virtual machine 510 and thus an incremental backup is to be performed. The backup may be triggered based upon the virtual machine 510 being created and thus an initial full backup is to be performed. The backup may be triggered based upon a backup schedule maintained by the backup service of the storage environment 514 indicating that the backup is to be performed. The backup may be triggered based upon a threshold amount of data being changed within virtual machine disks 512 of the virtual machine 510.

In an embodiment of performing an initial baseline backup of the virtual machine 510, the agent component 502 utilizes the virtual machine agent 505 to interact with APIs of the virtual machine management platform 503 of the computing environment 508 to initiate the creation of a baseline snapshot of the virtual machine 510 hosted by the computing environment 508. The baseline snapshot may capture a state of virtual machine disks of the virtual machine 510 at a point in time. The virtual machine management platform 503 may temporarily store the baseline snapshot within the computing environment 508. However, the baseline snapshot will be deleted after being backed up to the storage environment 514 due to the prohibitive cost and performance overhead of maintaining snapshots within the computing environment 508.

The virtual machine management platform 503 may generate metadata describing the baseline snapshot, and store the metadata within the computing environment 508. The agent component 502 uses the virtual machine agent 505 to retrieve the metadata of the baseline snapshot from the computing environment 508. The metadata may comprise a snapshot identifier of the baseline snapshot, virtual machine disk information of the virtual machine disks 512 captured by the baseline snapshot, and/or a variety of other information. For example, the metadata may comprise a disk layout of the virtual machine disks 512 of the virtual machine 510 captured by the baseline snapshot, disk attributes of the virtual machine disks 512, file information of files within the virtual machine disks 512, a list of inodes of the files, and/or a variety of information relating to the snapshot.

In an example, the snapshot identifier is a universal snapshot identifier mapped to an identifier used by the computing environment 508 and/or the virtual machine management platform 503 to refer to the baseline snapshot. That is, the snapshot identifier is created for the baseline snapshot when the baseline snapshot is created. In this way, the snapshot identifier can be subsequently provided to the computing environment 508, such as to the virtual machine management platform 503, to perform an incremental backup of changes to the virtual machine 510 since the baseline snapshot was created by the virtual machine management platform 503. The snapshot identifier can also be used by the storage environment 514 to identify a common snapshot of the virtual machine 510 that is common to both the computing environment 508 and the storage environment 514 (e.g., the baseline snapshot, having the snapshot identifier, is the common snapshot between the computing environment 508 and the storage environment 514). The common snapshot may also be used for an incremental backup to backup changed data between the common snapshot and a subsequent snapshot.

The virtual machine agent 505 processes the metadata to generate a metafile that can be stored within the storage environment 514 in a format that can be subsequently interpreted and used by any agent component and/or storage service hosted by the storage environment 514 for performing a subsequent incremental backup of the virtual machine 510 or other operation. The metafile is transferred from the agent component 502, through the storage agent 507, to the storage environment 514, such as into a volume 516 within which snapshots of the virtual machine 510 are to be backed up.

The agent component 502 uses the virtual machine agent 505 to retrieve snapshot data of the baseline snapshot from the computing environment 508. Because the baseline snapshot is to be transferred through the storage agent 507 to the storage environment 514 for management by the storage services of the storage environment 514 (e.g., the snapshot management service, the backup service, etc.), the baseline snapshot is reformatted into a format compatible with and understood by APIs of the storage services. For example, the baseline snapshot is formatted into a protocol format used by the storage services of the storage environment 514, such as into a snapshot service protocol understood by snapshot functionality and APIs of the snapshot management service associated with the storage environment 514. After being formatted, the baseline snapshot is transmitted from the agent component 502 through the storage agent 507 to the storage environment 514, such as for storage within the volume 516 maintained by the storage environment 514.

In response to the baseline snapshot being successfully transferred and stored along with the metafile within the storage environment 514, the baseline snapshot may be deleted from the computing environment 508. For example, the virtual machine agent 505 may interact with APIs of the virtual machine management platform 503 in order to instruct the virtual machine management platform 503 to delete the baseline snapshot from the computing environment 508. The computing environment 508 may host a substantial number of virtual machines, and retaining numerous snapshots for each virtual machine would be cost and resource prohibitive due to the cost and performance overhead of maintaining snapshots within the computing environment 508. Thus, deleting snapshots after the snapshots are backed up to the storage environment 514 reduces storage usage and costs because maintaining snapshots within the computing environment 508 would otherwise be prohibitively expensive.

During the backup of the virtual machine 510, the agent component may maintain state information 506. The state information 506 may comprise a backup state of the backup process. If an error or failure occurs with the backup process, then the backup state within the state information 506 may be used to restart or resume the backup process. This is because agent components are stateless and the metafile comprises information that can be used by any agent component to resume a backup process, restart a backup process, and perform a subsequent backup process for the virtual machine 510 even if a different agent component performed a prior backup of the virtual machine 510.

The agent component 502 may determine that an incremental backup of the virtual machine 510 is to be performed. Accordingly, the metafile may be evaluated by the agent component 502 to identify the snapshot identifier of the baseline snapshot. A snapshot creation request, comprising the snapshot identifier, may be transmitted through the virtual machine agent 505 to the computing environment 508 to create the snapshot. For example, an API of the virtual machine management platform 503 may expect/require a snapshot identifier of a prior snapshot (e.g., the prior snapshot is a common snapshot common to both the computing environment 508 and the storage environment 514) that is to be used as part of the incremental backup. The computing environment 508 can use the snapshot identifier to identify the prior snapshot that can be compared with another snapshot to identify incremental data of the virtual machine 510 to include within the snapshot. The incremental data may correspond to changed data within the virtual machine disks 512 of the virtual machine 510 since the baseline snapshot, identified by the snapshot identifier, was created and backed up to the storage environment 514. In this way, the snapshot may represent the incremental data corresponding to changed data since the prior backup of the virtual machine 510 to the storage environment 514.

The virtual machine agent 505 may retrieve new metadata of the snapshot from the computing environment 508. The new metadata may comprise the snapshot identifier of the snapshot, virtual machine disk information of the virtual machine disks 512 captured by the snapshot, a disk layout of the virtual machine disks 512 of the virtual machine 510 captured by the snapshot, disk attributes of the virtual machine disks 512, file information of files within the virtual machine disks 512, a list of inodes of the files, and/or a variety of information relating to the snapshot. The agent component 502 may generate an updated metafile based upon the new metadata. The agent component 502 may utilize the storage agent 507 to store the updated metafile within the storage environment 514.

The agent component 502 may utilize the virtual machine agent 505 to acquire the snapshot from the computing environment 508 as the incremental data. The agent component 502 may format the incremental data (the snapshot) according the protocol format of the storage services of the storage environment 514, such as a protocol format of the snapshot management service. After being formatted to be compatible with the storage services of the storage environment 514, the incremental data (the snapshot) is transferred through the storage agent 507 to the storage environment 514 for storage. In this way, the virtual machine 510 may be incrementally backed up to the storage environment 514 in a manner that reduces network bandwidth and resource utilization because only the incremental data is transferred as opposed to all data of the virtual machine 510. Any number of incremental backups may be performed for the virtual machine 510.

The agent component 502 may determine that the virtual machine 510 is to be incrementally restored to a prior state of the virtual machine 510 captured in a prior snapshot 517 of the virtual machine 510. The prior snapshot 517 (e.g., a prior baseline snapshot or a prior incremental snapshot) may have been backed up from the computing environment 508 to the storage environment 514 for storage within the volume 516. The agent component 502 may determine that the incremental restore is to be performed based upon various triggers, such as receiving an incremental restore command, identifying a failure or error with the virtual machine 510, or any other trigger. In an example of initiating the incremental restore, backup and restore functionality of the storage environment 514 may request a transfer of data associated with the virtual machine 510 and/or the virtual machine disks 512 through the agent component 502. For example, the backup and restore functionality of the storage environment 514 may transmit the request through the storage agent 507 to the agent component 502. The backup and restore functionality of the storage environment 514 may create the request in response to an indication that the virtual machine 510 is to be restored to the prior state captured by the prior snapshot 517.

At 402 (of FIG. 4's exemplary method 400), the agent component 502 interacts with the computing environment 508 using the virtual machine agent 505 to cause the computing environment 508 to create a snapshot 518 (e.g., an incremental snapshot) of the virtual machine disks 512 of the virtual machine 510, as illustrated by FIG. 5A. The snapshot 518 may be created because the incremental restore will use a common snapshot between the computing environment 508 and the storage environment 514, which may not exist because the computing environment 508 does not retain snapshots of virtual machines 510 within the computing environment 508. Thus, the snapshot 518 will serve as a basis for the common snapshot. The snapshot 518 may be retained at the computing environment 508 until an incremental restore is performed.

The snapshot 518 may be created for subsequent transmission to the storage environment 514 based upon a backup and restore relationship 504 setup between the computing environment 508 and the storage environment 514. For example, the backup and restore relationship 504 may specify that backups of the virtual machine 510 are to be stored within the volume 516, such as within a particular folder of the volume 516 designated for backups of the virtual machine 510. In an embodiment, the virtual machine management platform 503 may capture the snapshot 518 while the virtual machine 510 is shut down into an off state so that data within the virtual machine disks 512 are not modified by client I/O during the incremental restore process.

The agent component 502 uses the virtual machine agent 505 to retrieve the snapshot 518 from the computing environment 508 by the agent component 502. The snapshot 518 is formatted into a format supported by the snapshot management service of the storage environment 514, such as a format understood by the backup and restore functionality of the storage environment 514. At 404, the snapshot 518 is transmitted to the storage environment 514 using the storage agent 507, which is stored as a common snapshot 519 by the storage environment 514 within the volume 516 or other data container of the storage environment 514. The common snapshot 519 and the snapshot 518 are common snapshots comprising a same representation of the virtual machine 510. That is, the common snapshot 519 and the snapshot 518 capture the same data within the virtual machine disks 512 of the virtual machine 510.

The storage environment 514 stores snapshots of the virtual machine disks 512 of the virtual machine 510 within the volume 516. The request to restore the virtual machine 510 corresponds to the prior state of the virtual machine 510 represented by the prior snapshot 517 of the virtual machine 510 stored within the volume 516. Accordingly, at 406, the common snapshot 519 (e.g., representing a current state of the virtual machine 510) and the prior snapshot 517 are evaluated to identify a data difference 522 of the virtual machine disks 512 between the prior snapshot 517 representing the prior state to which the virtual machine 510 is to be restored and the common snapshot 519 representing the current state of the virtual machine 510. In an example, the data difference 522 is identified by the backup and restore functionality of the storage environment 514 and is transmitted to the agent component 502 through the storage agent 507, as illustrated by FIG. 5B.

At 408, the agent component 502 initiates an incremental restore 524 of the virtual machine 510 by using the virtual machine agent 505 to transmit the data difference 522 to the computing environment 408 to apply to the virtual machine 510 and virtual machine disks 512. In an embodiment, the data different 522 may be formatted into a format expected by the computing environment 408. In this way, the incremental restore 524 modifies the virtual machine disks 512 of the virtual machine 510 to the prior state of the virtual machine disks 512 when the prior snapshot was created. Because the incremental restore 524 is performed instead of a full restore, less than all data of the common snapshot 519 and less than all data of the prior snapshot is transmitted as the data difference 522 to the computing environment 508. If an error occurs during the incremental restore 524, then a cleanup procedure is implemented. For example, the snapshot 518 may be used by the virtual machine management platform 503 to restore the virtual machine 510 to a state of the virtual machine 510 and the virtual machine disks 512 corresponding to when the snapshot 518 was captured. This state corresponds to the state of the virtual machine disks 512 before the incremental restore 524 started to modify data within the virtual machine disks 512.

In an example, once the incremental restore 524 is complete, a backup schedule specified by the backup and restore functionality of the storage environment 514 is implemented using the backup and restore relationship 504 at the agent component 502. The backup schedule is implemented to back up snapshots of the virtual machine disks 512 of the virtual machine 510 to the storage environment 514 after the virtual machine 510 has been restored to the prior state. In this way, data within the virtual machine disks 512 (e.g., changed data since a prior backup) may be incrementally backed up from the computing environment 508 to the storage environment 514 using incremental data captured within snapshots of the virtual machine 510. In an embodiment, the backup schedule is implemented to perform incremental backups to transfer delta data, corresponding to data written to the virtual machine disk 512 at the computing environment 508 since a prior backup, from the computing environment 508 to the storage environment 514 as incremental backup data. In this way, incremental backups are performed after a restore, such as after the incremental restore 524.

In an example, a restore of the virtual machine 510 may be performed to create a new virtual machine within the computing environment 508. For example, snapshots, stored within the volume 516 by the storage environment 514, are used to restore the virtual machine 510 as the new virtual machine within the computing environment 508. The backup and restore relationship 504 between the virtual machine 510 and the volume 516 may be retained notwithstanding the creation of the new virtual machine. In an embodiment, the backup and restore relationship 504 is deleted based upon a determination that a subsequent backup is to occur for the new virtual machine in order to back up the new virtual machine to the storage environment 514. Accordingly, a new backup and restore relationship is created between the new virtual machine and the volume 516, such that snapshots of the new virtual machine within the computing environment 508 are backed up to the storage environment 514 within the volume 516.

The agent component 502 may be configured to implement various commands supported by the storage environment 514. For example, a show command may be executed to identify attributes of the backup and restore relationship 504, such as to identify snapshots backed up into the volume 516, metafiles of snapshots stored within the volume 516, a mapping of virtual machines of the computing environment 508 to folders within the volume 516 into which backups of the virtual machines are to be stored, etc. In another example, an abort command may be executed to abort a transfer of data between the computing environment 508 and the storage environment 514, such as to abort the transfer of data associated with a backup, a restore, an incremental backup, an incremental restore, etc.

The agent component 502 may be configured to maintain the state information 506 pertaining to a backup process and/or a restore process (e.g., the incremental restore 524) between the computing environment 508 and the volume 516 of the storage environment 514. In an example, the state information 506 may be used to re-issue the restore process by the agent component 502 if the restore process encounters a failure. For example, if an error or failure occurs with the incremental restore 524, then a restore state within the state information 506 may be used to restart or resume the incremental restore 524. This is because agent components are stateless and metafiles stored within the storage environment, along with the state information 506, comprise information that can be used by any agent component 502 to resume a restore process, restart a restore process, and perform a subsequent restore process performed subsequent a prior backup or restore process performed by a different agent component 502.

Figure 6:
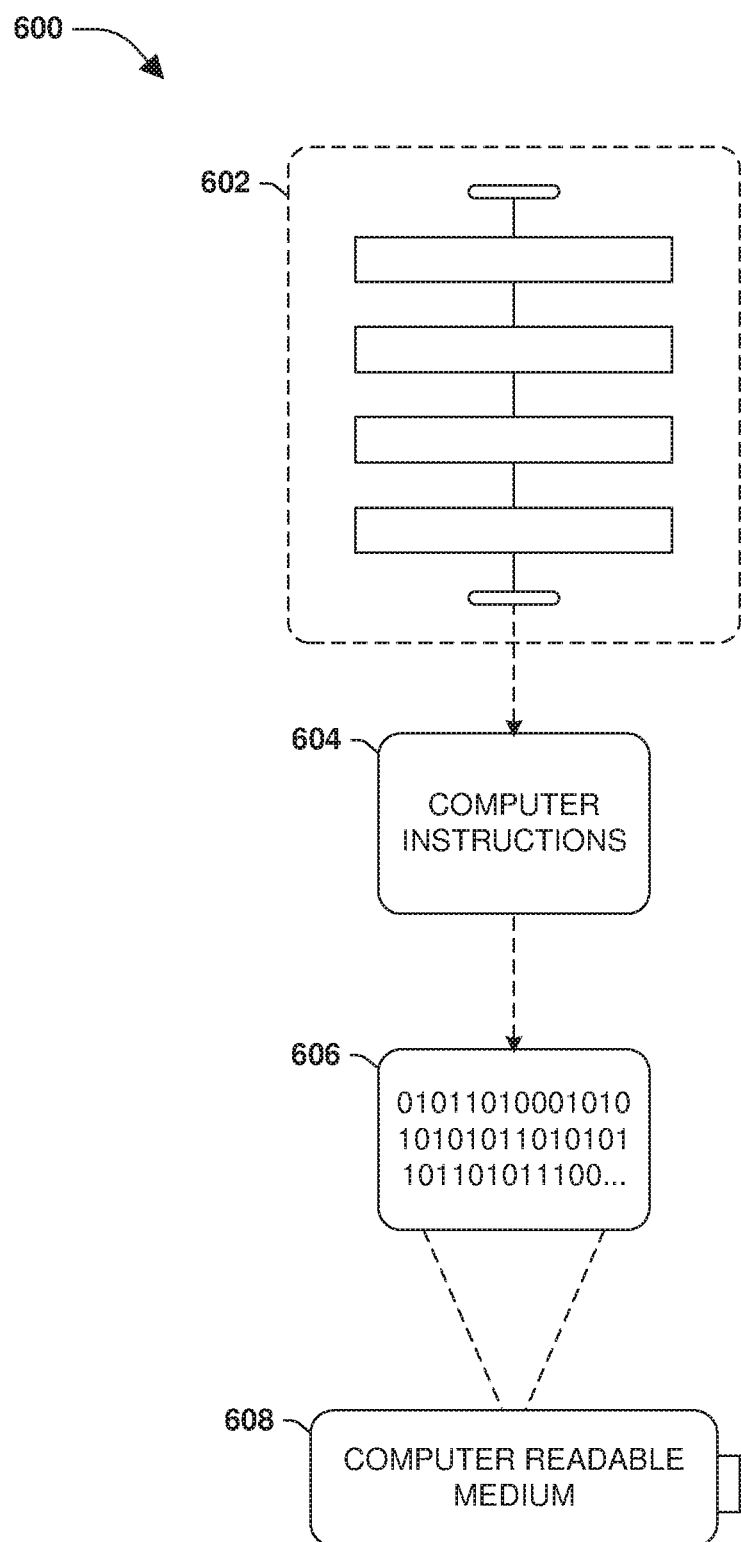
FIG. 6 is an example of a computer readable medium in which an embodiment of the invention may be implemented.

Still another embodiment involves a computer-readable medium 600 comprising processor-executable instructions configured to implement one or more of the techniques presented herein. An example embodiment of a computer-readable medium or a computer-readable device that is devised in these ways is illustrated in FIG. 6, wherein the implementation comprises a computer-readable medium 608, such as a compact disc-recordable (CD-R), a digital versatile disc-recordable (DVD-R), flash drive, a platter of a hard disk drive, etc., on which is encoded computer-readable data 606. This computer-readable data 606, such as binary data comprising at least one of a zero or a one, in turn comprises processor-executable computer instructions 604 configured to operate according to one or more of the principles set forth herein. In some embodiments, the processor-executable computer instructions 604 are configured to perform a method 602, such as at least some of the exemplary method 400 of FIG. 4, for example. In some embodiments, the processor-executable computer instructions 604 are configured to implement a system, such as at least some of the exemplary system 500 of FIGS. 5A-5B, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    creating a snapshot of a virtual machine hosted by a computing environment while the virtual machine is shut down into an off state;
    performing an incremental backup of the snapshot from the computing environment to a storage environment to create a common snapshot within a volume of the storage environment, wherein the snapshot and the common snapshot comprise a same representation of a virtual machine disk of the virtual machine;
    evaluating the common snapshot and a prior snapshot, stored within the storage environment, of the virtual machine to identify a data difference of the virtual machine between the common snapshot and the prior snapshot;
    performing an incremental restore of the virtual machine by transmitting the data difference from the storage environment to the computing environment to restore the virtual machine to a state represented by the prior snapshot; and
    retaining a backup and restore relationship between the virtual machine and the volume of the storage environment within which snapshots of the virtual machine are stored.

2. The method of claim 1, wherein the incremental restore transfers an amount of data that is smaller than full data of the prior snapshot.

3. The method of claim 1, wherein the incremental restore transfers less than all data of the prior snapshot from the storage environment to the computing environment.

4. The method of claim 1, wherein the incremental restore modifies the virtual machine disk of the virtual machine to a prior state of the virtual machine disk when the prior snapshot was created.

5. The method of claim 1, comprising:
    executing a show command to identify attributes of the backup and restore relationship between the virtual machine of the computing environment and the volume of the storage environment within which the snapshots of the virtual machine are stored, wherein the attributes indicate that the common snapshot, stored within the volume of the storage environment, is a backup of the virtual machine and that the common snapshot can be used to perform the incremental restore for the virtual machine.

6. The method of claim 1, comprising:
    executing an abort command to abort a transfer of data between the computing environment and the storage environment, wherein the transfer of data corresponds to transferring the data difference as part of the incremental restore.

7. The method of claim 1, comprising:
    upon completion of the incremental restore, implementing a backup schedule to backup snapshots of the virtual machine to the storage environment, wherein the backup schedule is implemented to perform incremental backups to transfer delta data, corresponding to data written the virtual machine disk at the computing environment since a prior backup, from the computing environment to the storage environment as incremental backup data.

8. The method of claim 1, comprising:
utilizing one or more snapshots, stored within the storage environment, of the virtual machine to restore the virtual machine as a new virtual machine within the computing environment.

9. The method of claim 8, comprising:
deleting the backup and restore relationship between the virtual machine and the volume of the storage environment based upon a determination that a new incremental backup is to occur for the new virtual machine.

10. The method of claim 8, comprising:
creating a new backup and restore relationship between the new virtual machine and the volume of the storage environment within which subsequently created snapshots are to be stored.

11. The method of claim 8, comprising:
utilizing a new backup and restore relationship between the new virtual machine and the volume of the storage environment within which subsequently created snapshots are to be stored to perform a new incremental backup from the new virtual machine to the volume.

12. The method of claim 1, comprising:
identifying attributes of the backup and restore relationship between the virtual machine of the computing environment and the volume of the storage environment.

13. The method of claim 1, comprising:
maintaining, by an agent component, a backup state of a backup process between the virtual machine of the computing environment and the volume of the storage environment within which the snapshots of the virtual machine are stored.

14. The method of claim 1, comprising:
maintaining, by an agent component, a restore state of a restore process between the virtual machine of the computing environment and the volume of the storage environment within which the snapshots of the virtual machine are stored.

15. The method of claim 14, wherein the restore state is used to re-issue the restore process by the agent component based upon a failure of the restore process.

16. The method of claim 1, comprising:
implementing a cleanup procedure based upon a determination that the incremental restore failed.

17. A non-transitory machine readable medium comprising instructions for performing a method, which when executed by a machine, causes the machine to:
create a snapshot of a virtual machine hosted by a computing environment while the virtual machine is shut down into an off state;
perform an incremental backup of the snapshot from the computing environment to a storage environment to create a common snapshot at the storage environment, wherein the snapshot and the common snapshot comprise a same representation of a virtual machine disk of the virtual machine;
evaluate the common snapshot and a prior snapshot, stored within the storage environment, of the virtual machine to identify a data difference of the virtual machine between the common snapshot and the prior snapshot;
perform an incremental restore of the virtual machine by transmitting the data difference from the storage environment to the computing environment to restore the virtual machine to a state represented by the prior snapshot; and
execute a command to identify attributes of a backup and restore relationship between the virtual machine of the computing environment and a volume of the storage environment within which snapshots of the virtual machine are stored, wherein the attributes indicate that the common snapshot, stored within the volume of the storage environment, is a backup of the virtual machine and that the common snapshot can be used to perform the incremental restore for the virtual machine.

18. The non-transitory machine readable medium of claim 17, wherein the incremental restore transfers less than all data of the common snapshot from the storage environment to the computing environment.

19. The non-transitory machine readable medium of claim 17, wherein the incremental restore transfers less than all data of the prior snapshot from the storage environment to the computing environment.

20. A computing device comprising:
a memory comprising machine executable code for performing a method; and
a processor coupled to the memory, the processor configured to execute the machine executable code to cause the processor to:
create a snapshot of a virtual machine hosted by a computing environment while the virtual machine is shut down into an off state;
perform an incremental backup of the snapshot from the computing environment to a storage environment to create a common snapshot at the storage environment, wherein the snapshot and the common snapshot comprise a same representation of a virtual machine disk of the virtual machine;
evaluate the common snapshot and a prior snapshot, stored within the storage environment, of the virtual machine to identify a data difference of the virtual machine between the common snapshot and the prior snapshot;
perform an incremental restore of the virtual machine by transmitting the data difference from the storage environment to the computing environment to restore the virtual machine to a state represented by the prior snapshot; and
execute an abort command to abort a transfer of data between the computing environment and the storage environment, wherein the transfer of data corresponds to transferring the data difference as part of the incremental restore.

21. A method, comprising:
creating a snapshot of a virtual machine hosted by a computing environment while the virtual machine is shut down into an off state;
performing an incremental backup of the snapshot from the computing environment to a storage environment to create a common snapshot within a volume of the storage environment, wherein the snapshot and the common snapshot comprise a same representation of a virtual machine disk of the virtual machine;
evaluating the common snapshot and a prior snapshot, stored within the storage environment, of the virtual machine to identify a data difference of the virtual machine between the common snapshot and the prior snapshot;
performing an incremental restore of the virtual machine by transmitting the data difference from the storage environment to the computing environment to restore the virtual machine to a state represented by the prior snapshot;

utilizing one or more snapshots, stored within the storage environment, of the virtual machine to restore the virtual machine as a new virtual machine within the computing environment; and deleting a backup and restore relationship between the virtual machine and the volume of the storage environment based upon a determination that a new incremental backup is to occur for the new virtual machine.

22. A method, comprising:

creating a snapshot of a virtual machine hosted by a computing environment while the virtual machine is shut down into an off state;

performing an incremental backup of the snapshot from the computing environment to a storage environment to create a common snapshot within a volume of the storage environment, wherein the snapshot and the common snapshot comprise a same representation of a virtual machine disk of the virtual machine;

evaluating the common snapshot and a prior snapshot, stored within the storage environment, of the virtual machine to identify a data difference of the virtual machine between the common snapshot and the prior snapshot;

performing an incremental restore of the virtual machine by transmitting the data difference from the storage environment to the computing environment to restore the virtual machine to a state represented by the prior snapshot;

utilizing one or more snapshots, stored within the storage environment, of the virtual machine to restore the virtual machine as a new virtual machine within the computing environment; and creating a new backup and restore relationship between the new virtual machine and the volume of the storage environment within which subsequently created snapshots are to be stored.

23. A method, comprising:

creating a snapshot of a virtual machine hosted by a computing environment while the virtual machine is shut down into an off state;

performing an incremental backup of the snapshot from the computing environment to a storage environment to create a common snapshot within a volume of the storage environment, wherein the snapshot and the common snapshot comprise a same representation of a virtual machine disk of the virtual machine;

evaluating the common snapshot and a prior snapshot, stored within the storage environment, of the virtual machine to identify a data difference of the virtual machine between the common snapshot and the prior snapshot;

performing an incremental restore of the virtual machine by transmitting the data difference from the storage environment to the computing environment to restore the virtual machine to a state represented by the prior snapshot;

utilizing one or more snapshots, stored within the storage environment, of the virtual machine to restore the virtual machine as a new virtual machine within the computing environment; and utilizing a new backup and restore relationship between the new virtual machine and the volume of the storage environment within which subsequently created snapshots are to be stored to perform a new incremental backup from the new virtual machine to the volume.

* * * * *